(12) United States Patent
Enomoto (10) Patent No.: US 6,357,576 B1
(45) Date of Patent: Mar. 19, 2002

(54) CHIP CONVEYORS AND APPARATUS FOR SEPARATING AND COLLECTING CHIPS

(75) Inventor: Yukio Enomoto, Gifu (JP)

(73) Assignee: Enomoto Industry Co., Ltd, Gifu (JP)

( * ) Notice: Subject to any disclaimer, the term of this patent is extended or adjusted under 35 U.S.C. 154(b) by 0 days.

(21) Appl. No.: 09/503,810

(22) Filed: Feb. 15, 2000

(51) Int. Cl.$^7$ .............................................. B65G 45/22
(52) U.S. Cl. ...................... 198/495; 409/137; 210/523; 210/531; 82/52; 82/901
(58) Field of Search .......... 198/495; 409/137; 210/531, 523; 82/52, 901

(56) References Cited

U.S. PATENT DOCUMENTS

| | | | | |
|---|---|---|---|---|
| 3,998,321 A | * | 12/1976 | Schultz ........................ | 198/495 |
| 4,601,385 A | * | 7/1986 | Sloan et al. ................. | 198/495 |
| 5,078,256 A | * | 1/1992 | Hatano et al. ............... | 409/137 |
| 6,035,996 A | * | 3/2000 | Swift ........................... | 198/495 |

FOREIGN PATENT DOCUMENTS

| | | |
|---|---|---|
| JP | 61-191849 | 11/1986 |
| JP | 1-176412 | 7/1989 |
| JP | 3009783 | 2/1995 |
| JP | 9-174376 | 7/1997 |
| JP | 10-58273 | 3/1998 |
| JP | 3055421 | 10/1998 |

* cited by examiner

Primary Examiner—Joseph E. Valenza
(74) Attorney, Agent, or Firm—Knoble & Yoshida, LLC (57) ABSTRACT

A chip conveyor includes an endless carrier that circulates in a predetermined direction such that chips discharged by machine tools are collected at a collecting position, are carried to a discharging position, which is spaced from the collecting position by a predetermined distance, and are discharged at the discharging position. The carrier follows an upper path from the collecting position to the discharging position and returns through a lower path from the discharging position to the collecting position. A reservoir tank is provided to correspond to the lower path of the carrier. The carrier passes through the reservoir tank, and chips attached to the carrier are separated from the carrier in a liquid in the reservoir tank.

12 Claims, 6 Drawing Sheets

CHIP CONVEYORS AND APPARATUS FOR SEPARATING AND COLLECTING CHIPS

BACKGROUND OF THE INVENTION

The present invention relates to a chip conveyor for conveying chips produced by machine tools such as lathes from a collection position to a discharge position. Also, the present invention relates to an apparatus used in the chip conveyor for separating and collecting chips.

Japanese Unexamined Utility Model Publication No. 59-55645 describes a prior art chip conveyor. The chip conveyor includes a circulating carrier and a detachable bucket located at a chip discharge position. Chips with cutting oil are conveyed to the discharge position by the carrier and are received in the bucket when the carrier curves to the discharge position. Many small holes for screening oil are formed in the bottom of the bucket.

A nozzle blows air against a lower surface of the carrier so that chips adhering to the lower surface of the carrier fall into the bucket. Oil on the chips passes through the small holes of the bucket and is collected outside the bucket through an oil tube.

However, in the above chip conveyor, the force of air blown from the nozzle is not strong enough to separate and collect all the chips adhering to the lower surface of the carrier. It is possible to separate the chips from the carrier by increasing the air pressure in the nozzle. However, this requires a special structure for preventing chips from being scattered and a supply source of high-pressure fluid.

On the other hand, the present applicants have suggested another chip conveyor, which is described in Japanese Unexamined Patent publication No. 63-123656. In the chip conveyor, an endless mesh belt is located inward of a horizontal frame and an inclined frame. Also, a chip collection tank is located at a chip collecting position. Circulation of the belt conveys chips into a chip collection tank, which removes chips from the belt. Also, a spray is located between the upper run and the lower run of the mesh belt in the horizontal frame. The spray discharges cleaning liquid against the lower run of the mesh belt, which cleans the lower run.

However, spraying cleaning liquid against the mesh belt cannot remove all the chips. Also, the chip conveyor requires a special structure for preventing splatter of the cleaning liquid and preventing the chips from scattering, and a source of high pressure fluid is also required.

If some of chips are still attached to the carrier such as a belt after the carrier passes a chip discharge position, the remaining chips may enter between contacting parts that form the carrier and the driving mechanism of the carrier, which wears the parts and shortens the life of the driving mechanism. If the remaining chips fall from the bucket at the collecting position and form a pile, which is troublesome to remove manually.

The present invention was developed to solve the above problems. That is, an objective of the present invention is to provide a chip conveyor that extends the life of the carrier and the driving mechanism by removing chips from the carrier that pass through the chip discharge position and reach the chip collection position.

Another objective of the present invention is to provide a simplified apparatus for separating and collecting chips that facilitates attachment and detachment to the discharge portion of the chip conveyor.

SUMMARY OF THE INVENTION

To achieve the above objectives, the preferred embodiments of the present invention provide a chip conveyor that collects chips discharged from machine tools at a collection position and has an endless carrier arranged to circulate in a predetermined direction. The carrier of the chip conveyor travels on an upper path from the collection position to the discharge position and travels on a lower path when returning from the discharge position to the collection position. A reservoir tank is located in the lower path of the carrier. Chips attached to the carrier are separated from the carrier in the liquid of the reservoir tank when the carrier is in the tank.

Preferably, a part of the carrier corresponding to the lower path takes a roundabout route downward to separate from a part corresponding to the upper path and enters the liquid of the reservoir tank. A discharging means for discharging chips from the reservoir is preferably provided in the reservoir. A supplying means for supplying liquid is preferably provided in the reservoir tank. In the preferred embodiments, a collecting tank is located at the collecting position, and the carrier passes through the collecting tank. The discharging means includes a means for sending excess liquid to the collecting tank.

In another embodiment of the present invention, an apparatus for separating and collecting chips is used in the chip conveyor. The apparatus includes a reservoir tank, which is located in the lower route and accommodates liquid through which the carrier passes and a roundabout mechanism, which is located in the reservoir tank and gives the carrier a roundabout route.

DETAILED DESCRIPTION OF THE PREFERRED EMBODIMENTS

A chip conveyor for machine tools according to one embodiment of the present invention will now be described with reference to FIGS. 1–4.

Figure 4:
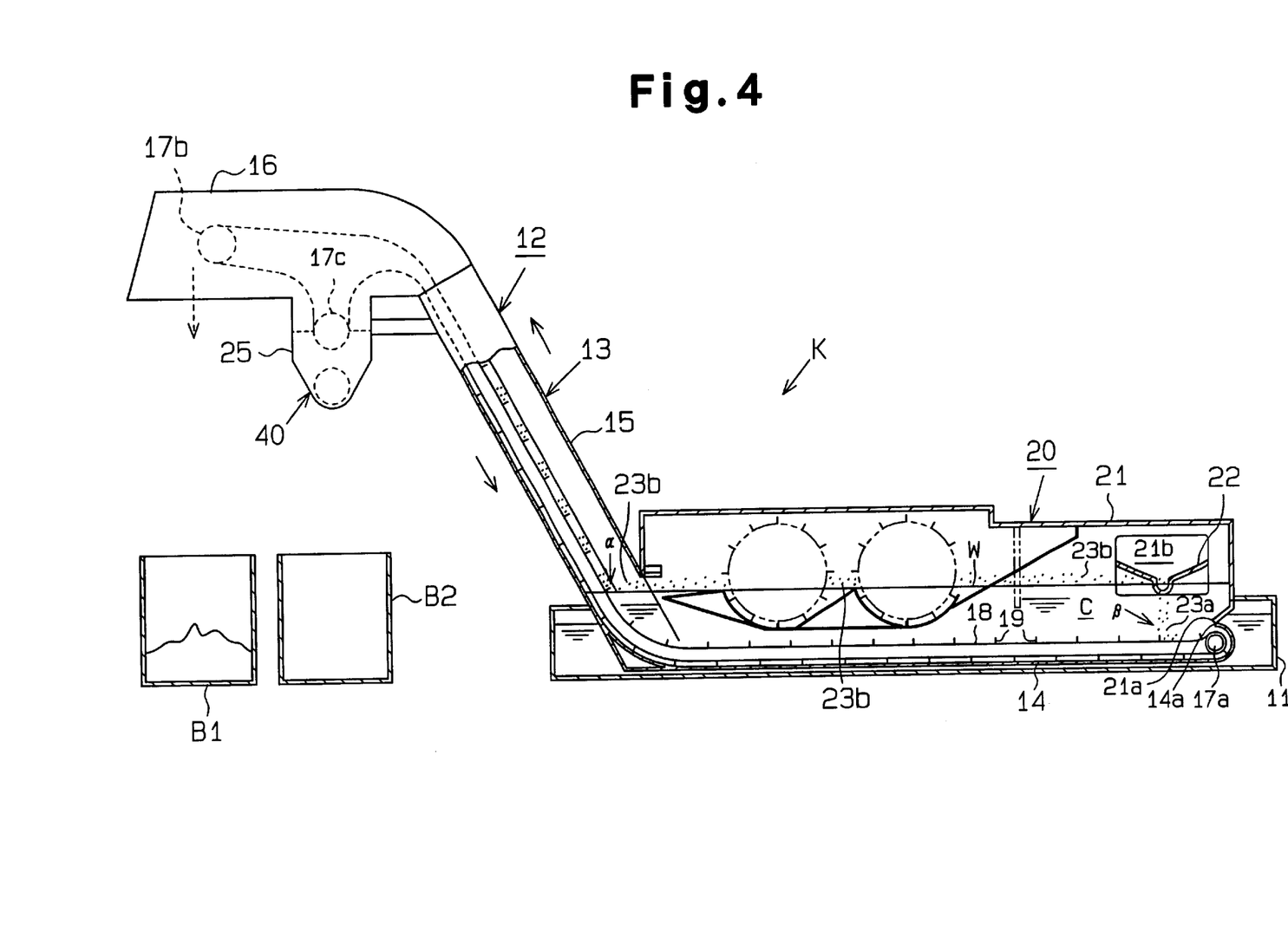
FIG. 4 is a cross-sectional view showing the whole chip conveyor.

FIG. 4 shows an entire chip conveyor K. A machine tool (not shown) is located on one side of the chip conveyor K. When the machine tool cuts a product, chips are produced. The chip conveyor K is installed on a floor such that the chips are collected from the machine tool and carried to another location.

A collecting tank 11 is located at the chip collecting position. A water-soluble or oil-based coolant liquid C occupies the tank 11. A lower horizontal portion of a conveyor body 12 is located in the collecting tank 11. A housing 13 of the conveyor body 12 includes a collecting portion 14, an elevating portion 15, and a discharging portion 16. The collecting portion 14 extends horizontally in the collecting tank 11, the elevating portion 15 extends diagonally upward from the collecting portion 14, and the discharging portion 16 extends substantially in a horizontal direction from the upper end of the elevating portion 15 to the discharging position.

Sprockets 17a, 17b are rotatably supported in the collecting portion 14 and discharging portion 16 of the housing 13. The sprockets 17a, 17b receive an endless carrier 18. Carrying scrapers 19 are formed on the outer surface of the carrier 18 at predetermined intervals. A motor (not shown) drives the carrier 18, which circulates counterclockwise along the collecting portion 14, the elevating portion 15, and the discharging portion 16, as shown by the arrow in FIG. 4.

A segregating device 20 is located on the collecting portion 14 of the housing 13 over the carrier 18. A lower opening 21a of a casing 21 of the segregating device 20 is connected to an upper opening 14a of the collecting portion 14. An entrance 21b is formed in a side wall of the casing 21 at the upstream side. The downstream end of a gutter 22, which extends into the casing 21 from the machine tool, is received in the entrance 21b. The coolant liquid C, which includes chips 23 discharged from the machine tool, flows into the casing 21 through the gutter 22. The chips 23 includes heavy chips 23a that sink below the surface W of the coolant liquid C in the casing 21 and light chips 23b that float on the surface W. The carrier 18 collects the floating chips 23b at a position α at which the carrier 18 crosses the coolant surface W in the elevating portion 15. Also, at a position β in which the carrier 18 faces the gutter 22, the carrier collects the sinking chips 23a.

A device 25 for separating and collecting chips will now be described. The device 25 is attached to a lower side of the discharging portion 16.

In this embodiment, an outbound route of the carrier 18 is from the collecting tank 11 at the chip collecting position to the discharging portion 16 at the discharging position. A return route of the carrier 18 is from the discharging position to the collecting tank 11.

The discharging portion 16 includes a pair of side walls 26, which support a support shaft 24 of the sprocket 17b. The distal ends and lower sides of the walls 26 are open. Some of the chips 23 carried by the carrier 18 fall from the carrier 18 while it turns at its distal end at the end of the discharging portion 16 as shown by the arrow in FIG. 1. The fallen chips are collected in a collecting box B1 shown in FIG. 4.

Figure 1:
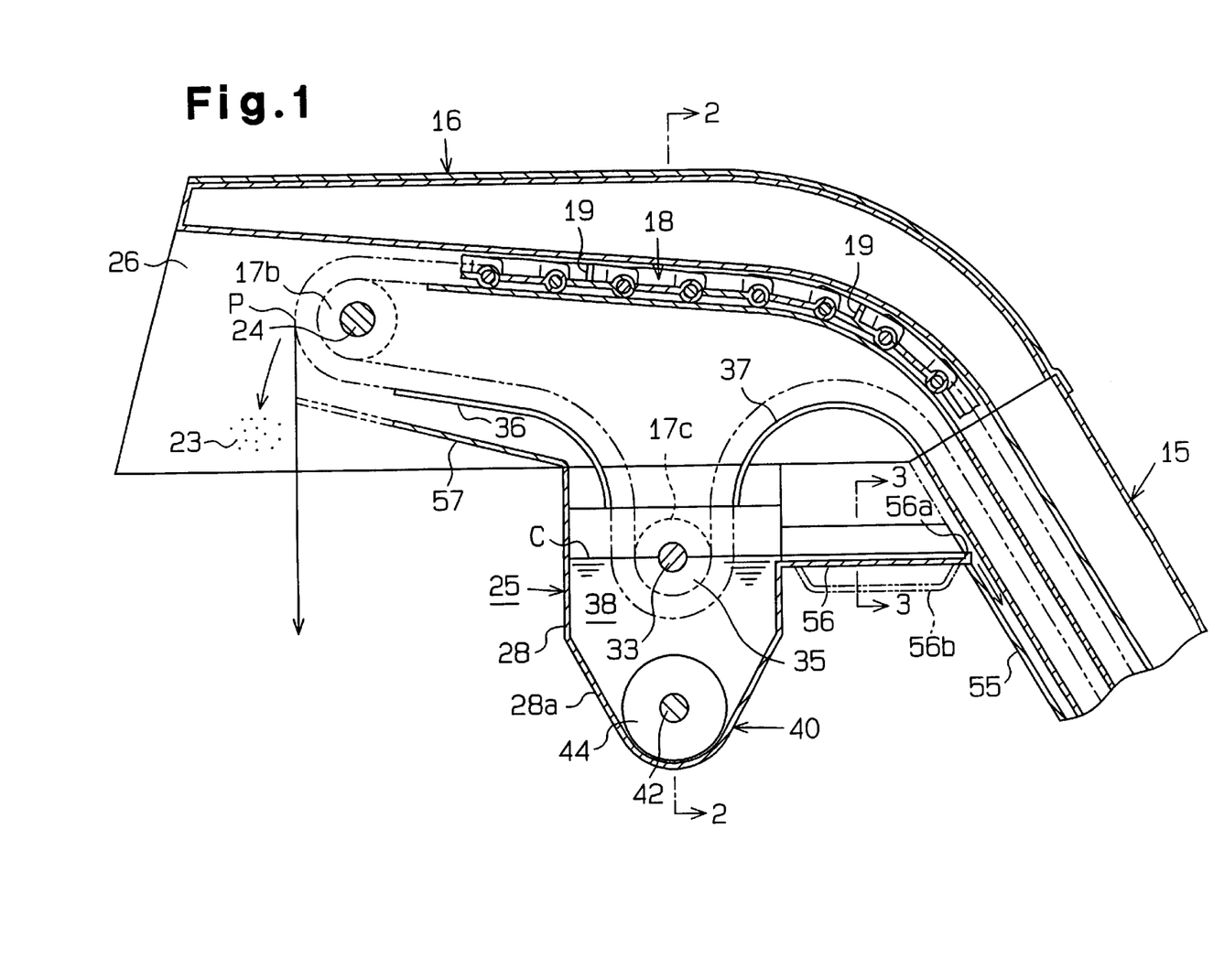
FIG. 1 is a cross-sectional view showing an apparatus for separating and collecting chips according to one embodiment of the present invention.

The device 25 is attached to the lower ends of the side walls 26 to separate and collect remaining chips from the carrier 18. The device 25 includes a reservoir tank 28. Metal flanges 27 are welded to the outer sides of the side walls 26. Metal flanges 29 are welded to the reservoir tank 28. The flanges 27 are fastened to the flanges 29 by bolts 30 and nuts 31, which fixes the reservoir tank 28 to the side walls 26.

The upper part of the tank 28 is open and faces the lower surface of the discharging portion 16. The lower portion of the tank 28 is tapered, and the cross-sectional shape of the lower end is arcuate.

A support shaft 33 is rotatably supported in the reservoir tank 28 through bearings 34. A pair of sprocket wheels 35 are attached to the support shaft 33 to give the carrier 18 a roundabout route, or detour, into the tank 28. Guide flanges 36, 37 are located on the inner surfaces of the side walls 26 to guide the sides of the carrier 18. In the embodiment of FIG. 1, the support shaft 33, the bearings 34, and the sprocket wheels 35 form a roundabout mechanism or detour mechanism, of the carrier 18.

An inner space 38 of the reservoir tank 28 is occupied with the coolant liquid C. Chips 23 are separated from the carrier 18 when the carrier takes the roundabout route and is immersed in the coolant liquid C. The separated chips 23 fall to the bottom of the reservoir tank 28. A screw conveyor 40 is attached to the lower arcuate portion of the tank 28 to discharge the chips from the bottom.

Figure 2:
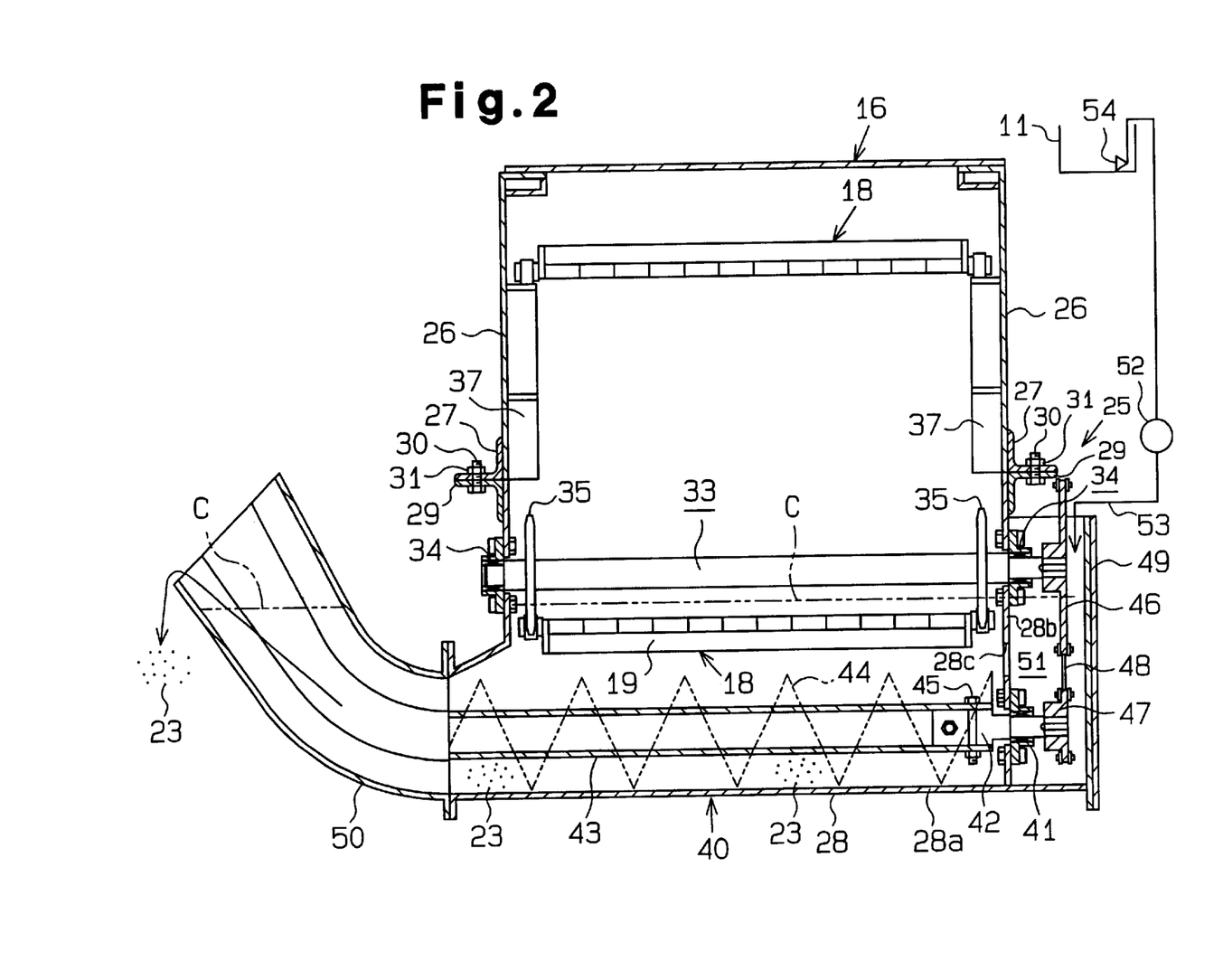
FIG. 2 is a cross-sectional view taken along the line 2—2 of FIG. 1.
Figure 3:
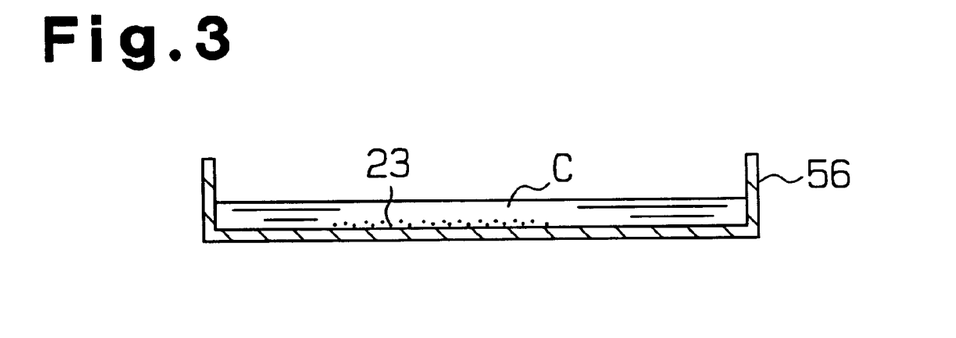
FIG. 3 is a cross-sectional view taken along the line 3—3 of FIG. 1.

In the conveyor 40, a discharging gutter 28a, which is parallel to the support shaft 33, is formed at the lower portion of the reservoir tank 28. A rotation shaft 42 is supported on one side wall 28b of the tank 28 to correspond to the gutter 28a. An impeller 44 is welded to an attachment tube 43, which is engaged with the rotation shaft 42. A pin 45 couples the rotation shaft 42 to the attachment tube 43. A drive sprocket wheel 46 is attached to an outer end of the support shaft 33, and a driven sprocket wheel 47 is fixed to an outer end of the rotation shaft 42. The sprocket wheels 46, 47 receive a chain 48.

The position of the distal periphery of the impeller 44 of the screw conveyor 40 is determined by the inner surface of a discharging tube 50, which has a circular cross-section.

An auxiliary reservoir tank 49 for accommodating the sprocket wheels 46, 47 and the chain 48 is located on one outer wall of the reservoir tank 28. The discharging tube 50 is attached to the other side wall of the tank 28 to extend diagonally upward and is connected to the discharging gutter 28a. The distal opening of the discharging tube 50 is located higher than the surface of the coolant liquid C in the reservoir tank 28.

As shown in FIG. 2, the inner space 38 of the tank 28 is connected to an inner space 51 of the auxiliary tank 49 by an opening 28c, which is formed in a side wall 28b. The collecting tank 11 includes a cleaner 54. The coolant liquid in the collecting tank 11 is cleaned by the cleaner 54 and is supplied to the inner space 51 of the auxiliary tank 49 through a pump and a pipe 53, which serve as a liquid supplying means.

As shown in FIG. 1, a horizontal draining gutter 56 is located between a panel 55, which forms the elevating portion 15, and the tank 28 to drain coolant liquid C from the tank 28 to the panal 55. That is, the draining gutter 56 is an outlet of the reservoir tank 28. The draining gutter 56 also serves as a means for sinking fine chips 23 in the coolant liquid to the bottom of the draining gutter 56 and for collecting chips 23.

The draining gutter 56 includes a dam plate 56a, which prevents fine chips 23 from moving toward the panel 55. A basin-shaped recess 56 is formed at the bottom of the draining gutter 56 as shown by the broken line in FIG. 1. The recess 56 collects sinking chips 23.

As shown in FIG. 1, a guide 57 is located between the tank 28 and the sprocket wheel 17b, and both rims of the guide 57 are fixed to the side walls 26 by welding or the like. The distal end of the guide 57 is bent from the side of the sprocket wheel 17b to the side of the tank 28 and covers the lower portion of the carrier 18. Accordingly, the guide 57 guides chips 23 and coolant liquid C that fall from the carrier 18 after passing the sprocket wheel 17b into the tank 28.

The distal end of the guide 57 may be located as shown in FIG. 1 or located near a vertical line that passes through the turning point P of the carrier 18, as shown by the broken lines in FIG. 1. In this case, a larger amount of coolant liquid C is guided to the tank 28 along the guide 57, which reduces the amount of cooling liquid that falls into the collecting box B1. operation of the above chip conveyor will now be described.

As shown in FIG. 4, when cooling liquid C containing chips 23 flows into the casing 21 through the gutter 22, heavy chips 23a sink near the collecting position β and are collected between each scraper 19 on the carrier 18. Light chips 23b float on the surface W of coolant liquid. When the carrier 18 moves up from the liquid surface W, light chips 23b are scooped up by the scrapers 19. The carrier 18 carries heavy chips 23a and light chips 23b up the elevating portion 15 and to the opening of the discharging portion 16. When the carrier 18 turns after passing the sprocket wheel 17b, relatively large heavy chips 23a fall from the carrier 18 and are collected in the collecting box B1.

Some of the heavy chips 23a and the light chips 23b that remain attached to the carrier 18 after passing the sprocket wheel 17b move into the tank 28 of the separation and collection device 25 and are immersed in the coolant liquid C. The chips 23 are separated from the carrier 18 by the coolant liquid C and fall to the discharging gutter 28a.

As shown in FIG. 2, the circulation of the carrier 18 rotates the support shaft 33, which rotates the screw impeller 44 with the driving sprocket wheel 46, the chain 48, the driven sprocket wheel 47, and the rotation shaft 42. The impeller 44 moves chips 23 in the discharging gutter 28a toward the discharging tube 50. Chips 23 that fall from the discharging tube 50 are collected in the collecting box B2 shown in FIG. 4.

The illustrated chip separation and collection device has the following advantages.

(1) In the present embodiment, the reservoir tank 28 is attached to the lower part of the discharging portion 16, the tank 28 is filled with the coolant liquid C, and the carrier takes a roundabout route into the liquid. Accordingly, chips attached to the carrier 18 are separated from the surface of the carrier 18 in the tank 28.

The principle by which chips 23 are separated from the surface of the carrier 18 will now be explained. Assume that the chips 23 are aluminum particles, and the aluminum particles are attached to the surface of the carrier by oil of the coolant liquid. In this state, adhesive forces of oil and Van der Waals forces are applied between the carrier 18 and the aluminum particles, which causes the aluminum particles to be attached to the carrier 18. Regardless of the size of the particles, the adhesive forces are much greater than the Van der Waals forces. Accordingly, when the aluminum particles are immersed in the coolant liquid, the adhesive forces are removed, and the particles are attached to the carrier by Van der Waals forces alone. Van der Waals forces are subject to the environment. The strength of the Van der Waals forces is lower in a liquid compared to air. Therefore, the aluminum particles are efficiently separated from the carrier 18 when immersed in the coolant liquid.

(2) In the present embodiment, a screw conveyor 40 serves as a discharging means for discharging chips 23 in the lower portion of the tank 28. Therefore, chips 23 are automatically discharged.

(3) In the present invention, circulation of the carrier 18 drives the screw conveyor 40. Accordingly, there is no need for an independent drive source and the structure is simplified.

(4) In the present embodiment, a draining gutter 56 is located between the tank 28 and the shooter 55. Accordingly, in the process of draining coolant liquid from the tank 28 to the shooter through the draining gutter 56, fine chips 23 contained in the coolant liquid sink to the bottom of the draining gutter 56 when the flow speed of the liquid is set to be 0.1–1 m per minute. Therefore, fine chips 23 are collected, which prevents clogging of the cleaner 54 for screening coolant liquid in the collecting tank 11, which facilitates the maintenance. The slower the coolant liquid flows, the more certainly fine chips sink.

(5) In the present embodiment, the distal end of the discharging portion is open, the chips 23 naturally fall, and chips that do not fall are separated by the chip separating and collecting device 25. Accordingly, the supply of coolant liquid C to the tank 28 is minimized.

(6) In the present embodiment, the auxiliary tank 49 is attached to a side of the tank 28 and is connected to the tank 28. This increases the amount of coolant liquid C that is reserved. Also, the sprocket wheels 46, 47 and the bearings 34, 41 are located in the auxiliary tank 49. Accordingly, there is no need to provide a sealing mechanism for the bearings 34, 41, which simplifies the structure.

(7) In the present embodiment, since coolant liquid C is supplied to the auxiliary tank 49, the auxiliary tank 49 is supplied with clean coolant liquid. This prevents chips 23 from entering the driving mechanism of the screw conveyor 40, which improves the durability of the mechanism.

(8) In the present embodiment, the distal opening of the discharging tube 50 is higher than the surface of coolant C in the tank 28. Accordingly, the amount of coolant liquid attached to chips 23 discharged from the discharging tube 50 is reduced.

(9) In the present invention, the tank 28 and the sprocket wheels 35 form the chip separating and collecting device 25, which is attached beneath the discharging portion 16 and is removable. The carrier 18 passes through and is immersed in the liquid in the tank 28. The sprocket wheels 35 serve as a roundabout mechanism for imposing a roundabout route on the carrier 18. Therefore, the structure of the chip separating and collecting device 25 is simplified, which simplifies installation and removal of the device.

The present invention can be varied as follows.

Figure 5:
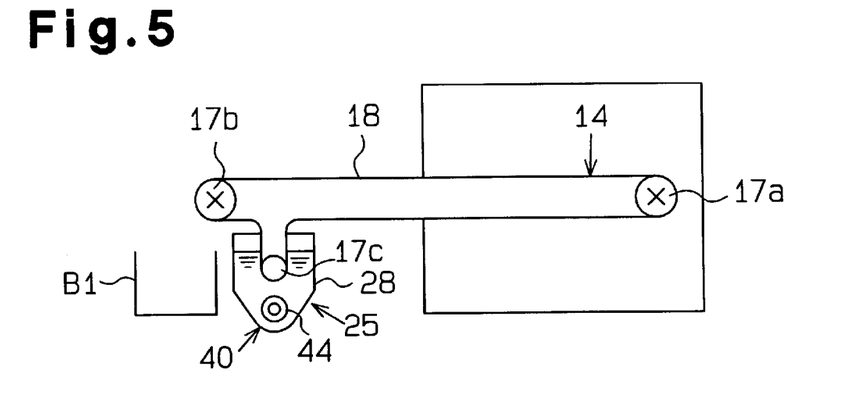
FIG. 5 is a diagrammatic front view showing another embodiment.

As shown in FIG. 5, the carrier 18 may be horizontally arranged and the chip separating and collecting device 25 may be located near the discharging portion, away from the chip collecting portion. The embodiment has substantially the same advantages as the first embodiment.

The collecting tank 11 for storing coolant liquid may be omitted so that chips with cutting oil fall on the upper surface of the carrier and are carried to the discharging position.

Figure 6:
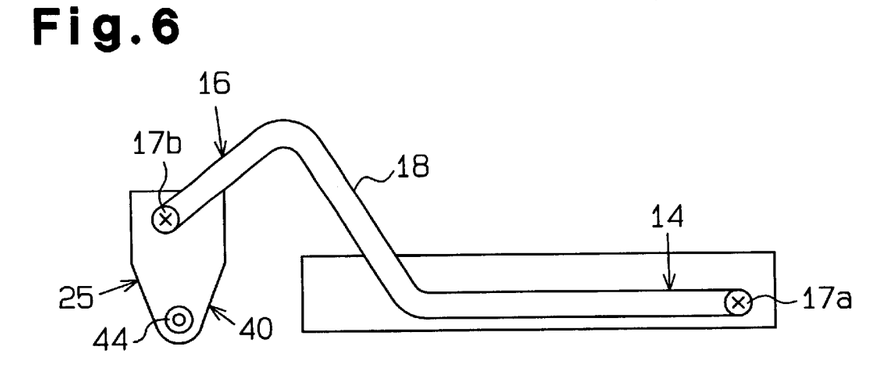
FIG. 6 is a diagrammatic front view showing another embodiment.

As shown in FIG. 6, the distal end of the carrier 18 may be located in the tank 28 of the chip separating and collecting device 25 at the discharging position. In this case, all the chips 23 on the carrier 18 are collected in the tank 28. This structure is simpler than the embodiment of FIG. 4.

Figure 7:
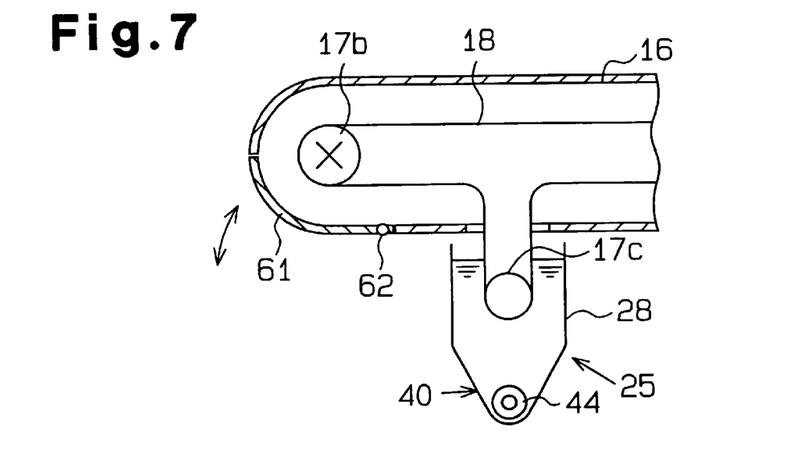
FIG. 7 is a partial cross-sectional view showing another embodiment.

As shown in FIG. 7, a panel or cover 61, may be pivotally supported by a shaft 62 at the distal end of the discharging portion 16. The size of the opening can be adjusted by adjusting the position of the cover 61. In this case, the cover 61 is closed when separating and collecting chips that do not fall from the carrier 18, and the cover 61 is opened when discharging chips that are likely to fall or when maintenance is performed.

Figure 8:
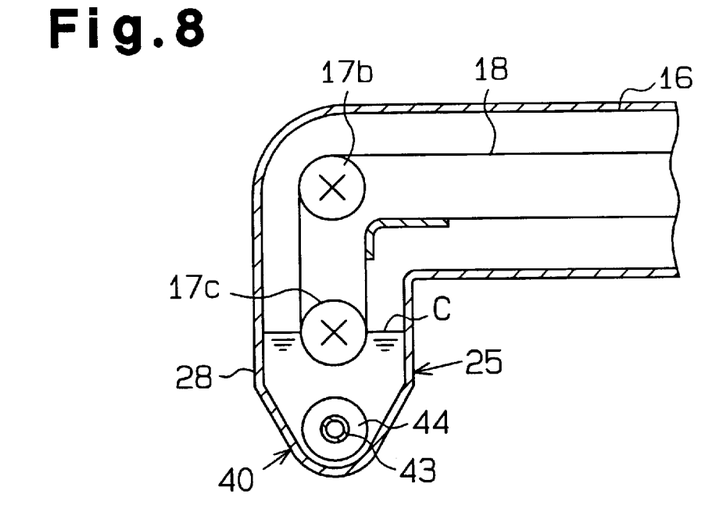
FIG. 8 is a partial cross-sectional view showing another embodiment.

As shown in FIG. 8, the discharging portion 16 may be sealed, and the chip separating and collecting device 25 may be located in the discharging portion 16. In this case, all chips 23 on the carrier 18 are collected in the tank 28 This structure is simpler than the embodiment of FIG. 4.

Figure 9:
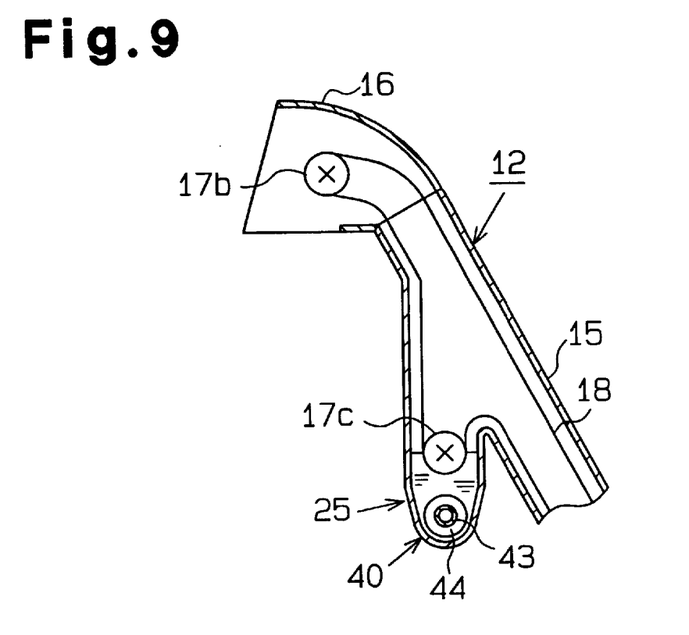
FIG. 9 is a partial cross-sectional view showing another embodiment.

As shown in FIG. 9, the chip separating and collecting device 25 may be located in the elevating portion 15. In this case, the space under the elevating portion is used effectively.

Figure 10:
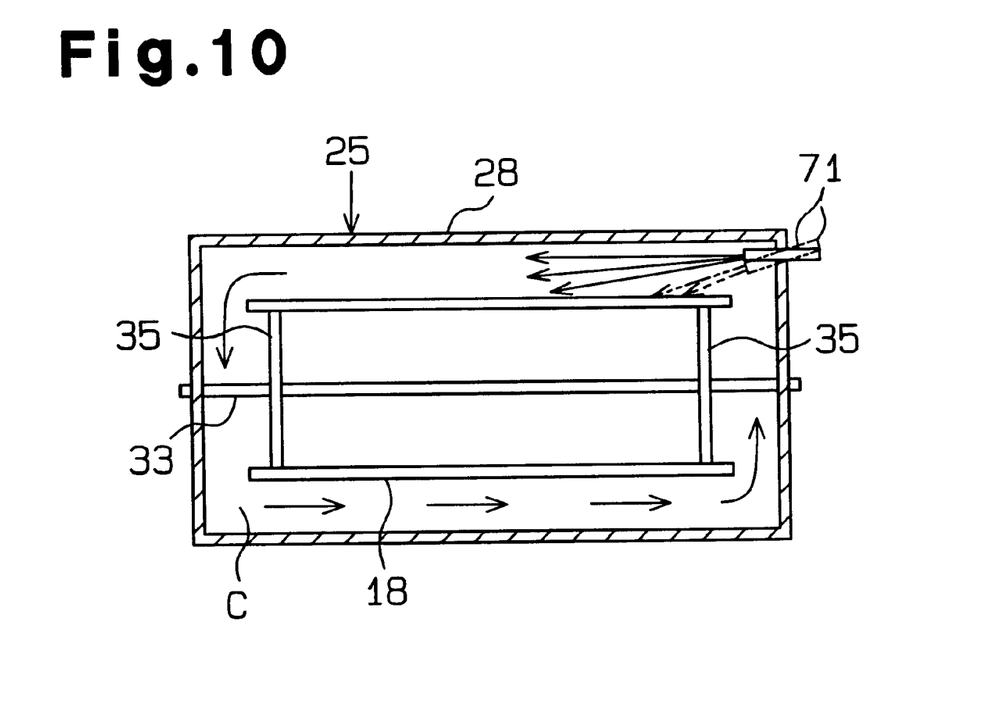
FIG. 10 is a partial cross-sectional view showing another embodiment.

As shown in FIG. 10, a nozzle 71 for supplying coolant liquid C may be located in the tank 28 such that the nozzle 71 is directed to the carrier 18 from a direction perpendicular to the direction in which the carrier moves. The nozzle 71 may also be arranged to cause circulating flow in the tank 28 and to stir the coolant liquid C in the tank 28. A screw may also stir the coolant liquid C in the tank 28. In this case, kinetic energy is applied to the coolant liquid C in the tank, which shears oil that attaches aluminum particles to the carrier. Therefore, the aluminum particles are effectively separated from the surface of the carrier 18. The nozzle 71 and the screw are thus fluid moving apparatuses.

The draining gutter 56 may be deeper, and a compact discharging means similar to the screw conveyor 40 and the discharging tube 50 may be formed on the bottom of the draining gutter 56. The discharging means is driven by the circulation of the carrier 18. In this case, fine chips sunken in the draining gutter 56 are automatically discharged.

Water, cleaning liquid and the like may be used instead of the coolant liquid C.

A scraping mechanism using scrapers may be used instead of the screw conveyor 40.

The discharging tube 50 may be a flexible tube such that the chip discharging direction may be varied.

In a chip conveyor according to the present invention, chips that remains on the carrier after passing by the chip discharging position are efficiently removed, which improves the durability of the carrier and the driving mechanism.

Also, a chip separating and collecting device according to the present invention simplifies the structure and facilitates attaching and detaching the device to and from the discharging portion of the chip conveyor.

I claim:

1. A chip conveyor comprising:

an endless carrier that circulates in a predetermined direction such that chips discharged by an associated machine tool are collected at a collecting position, are carried to a discharging position, which is spaced from the collecting position by a predetermined distance, and are discharged at the discharging position, wherein the endless carrier follows an upper path from the collecting position to the discharging position and returns through a lower path from the discharging position to the collecting position; and a reservoir tank provided in the lower path of the endless carrier, wherein the endless carrier passes through the reservoir tank, and the chips adhering to the endless carrier are separated from the endless carrier in a liquid in the reservoir tank, wherein the lower path includes a detour that extends away from the upper path into the reservoir tank, wherein the reservoir tank includes a discharge conveyor for removing the chips from the reservoir tank, wherein the discharge conveyor is driven by the endless carrier with a driving mechanism, and wherein an auxiliary reservoir tank is located on a wall of the reservoir tank, and part of the driving mechanism is located in the auxiliary reservoir tank.

2. A chip conveyor comprising:

an endless carrier that circulates in a predetermined direction such that chips discharged by an associated machine tool are collected at a collecting position, are carried to a discharging position, which is spaced from the collecting position by a predetermined distance, and are discharged at the discharging position, wherein the endless carrier follows an upper path from the collecting position to the discharging position and returns through a lower path from the discharging position to the collecting position;

a reservoir tank provided in the lower path of the endless carrier, wherein the endless carrier passes through the reservoir tank, and the chips adhering to the endless carrier are separated from the endless carrier in a liquid in the reservoir tank; and a fluid supply apparatus for supply liquid to the reservoir tank, wherein the fluid supply apparatus includes a pump for drawing fluid from a chip collecting tank, which is located at the collecting position, and a cleaner for cleaning the liquid drawn by the pump.

3. A chip conveyor comprising:

an endless carrier that circulates in a predetermined direction such that chips discharged by an associated machine tool are collected at a collecting position, are carried to a discharging position, which is spaced from the collecting position by a predetermined distance, and are discharged at the discharging position, wherein the endless carrier follows an upper path from the collecting position to the discharging position and returns through a lower path from the discharging position to the collecting position; and a reservoir tank provided in the lower path of the endless carrier, wherein the endless carrier passes through the reservoir tank, and the chips adhering to the endless carrier are separated from the endless carrier in a liquid in the reservoir tank, and wherein the reservoir tank includes an outlet for draining excess liquid.

4. The chip conveyor of claim 3, wherein the outlet includes a gutter into which chips from the excess liquid settle.

5. The chip conveyor of claim 4, Wherein the gutter guides the excess fluid in a horizontal direction at a relatively slow speed.

6. The chip conveyor of claim 3 including a collecting tank located at the collecting position, wherein the carrier enters the collecting tank to collect chips in the tank, wherein the outlet guides excess liquid to the collecting tank.

7. A chip conveyor comprising:

an endless carrier that circulates in a predetermined direction such that chips discharged by an associated machine tool are collected at a collecting position, are carried to a discharging position, which is spaced from the collecting position by a predetermined distance, and are discharged at the discharging position, wherein the endless carrier follows an upper path from the collecting position to the discharging position and returns through a lower path from the discharging position to the collecting position, and wherein the endless carrier is substantially covered with a housing, and a distal end of the housing has an opening for permitting the chips to fall at the discharging position; and a reservoir tank provided in the lower path of the endless carrier, wherein the endless carrier passes through the reservoir tank, and the chips adhering to the endless carrier are separated from the endless carrier in a liquid in the reservoir tank, and wherein the reservoir tank is attached to the housing, and the endless carrier enters the tank through the housing.

8. The chip conveyor according to claim 7 including a panel for guiding material that falls from the carrier to the reservoir tank is located between a distal end of the carrier and the reservoir tank.

9. The chip conveyor of claim 8, wherein the panel is a cover that is movable between a closed position, at which the opening of the housing is closed to prevent chips from falling, and an open position, at which chips are permitted to fall.

10. The chip conveyor of claim 1, wherein the upper path of the endless carrier includes a collecting section for collecting the chips, an elevating section for carrying the collected chips in an upwardly inclined direction, and a discharging section for carrying the chips to the discharging position, wherein the lower path is substantially parallel to the upper path, and the reservoir tank at the discharging section beneath the lower path, and the endless carrier takes a downward path into the tank.

11. The chip conveyor of claim 1 including a fluid moving apparatus for causing the fluid in the reservoir to move, which facilitates removal of the chips from the endless carrier.

12. The chip conveyor of claim 11, wherein the fluid moving apparatus is a spray nozzle for directing fluid.

* * * * *

UNITED STATES PATENT AND TRADEMARK OFFICE
CERTIFICATE OF CORRECTION

PATENT NO. : 6,357,576 B1
DATED : March 19, 2002
INVENTOR(S) : Yukio Enomoto

It is certified that error appears in the above-identified patent and that said Letters Patent is hereby corrected as shown below:

<u>Title page, Item [54] and Column 1, line 1,</u>
Change "CHIP CONVEYORS AND APPARATUS FOR SEPARATING AND COLLECTING CHIPS" to -- CHIP CONVEYOR AND APPARATUS FOR SEPARATING AND COLLECTING CHIP --.

Item [30], please add Foreign Application Priority Data:
-- Japan    11-107226    04/14/1999 --

Signed and Sealed this

Ninth Day of July, 2002

*Attest:*

*Attesting Officer*

JAMES E. ROGAN
*Director of the United States Patent and Trademark Office*